United States Patent
Meng et al.

(10) Patent No.: US 9,252,548 B1
(45) Date of Patent: *Feb. 2, 2016

(54) HIGH DENSITY NETWORKING COMPONENT FOR 1U PRODUCT FORM FACTOR AND ASSOCIATED RACK SYSTEM

(71) Applicant: Extreme Networks, Inc., San Jose, CA (US)

(72) Inventors: Alice Meng, Truckee, CA (US); Unnikrishnan Gangadharan, San Jose, CA (US); Marwan Naboulsi, San Carlos, CA (US); Gavin Richard Cato, Morrisville, NC (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/325,373

(22) Filed: Jul. 8, 2014

Related U.S. Application Data

(63) Continuation of application No. 13/463,752, filed on May 3, 2012, now Pat. No. 8,771,009.

(51) Int. Cl.
  *H01R 13/60* (2006.01)
  *H01R 24/64* (2011.01)

(52) U.S. Cl.
  CPC ..................... *H01R 24/64* (2013.01)

(58) Field of Classification Search
  CPC .. H01R 13/518; H01R 23/025; H01R 13/514; H04Q 11/142; G02B 6/3897
  USPC ....................... 439/540.1, 541.5, 676, 490, 79
  See application file for complete search history.

(56) References Cited

U.S. PATENT DOCUMENTS

| | | | | |
|---|---|---|---|---|
| 6,413,120 | B1* | 7/2002 | Winings et al. | 439/676 |
| 7,488,207 | B2* | 2/2009 | Zheng et al. | 439/541.5 |
| 7,839,628 | B1* | 11/2010 | Sivertsen | 361/679.32 |
| 8,100,701 | B2* | 1/2012 | Gerber et al. | 439/77 |

(Continued)

OTHER PUBLICATIONS

"RJ Point Five Connector System Overview," listed on TE Connectivity, downloaded on Jun. 5, 2012, 1 page.

(Continued)

*Primary Examiner* — Phuong Dinh
(74) *Attorney, Agent, or Firm* — Blakely, Sokoloff, Taylor & Zafman

(57) ABSTRACT

Systems and apparatuses are disclosed having a 3×8 stacked RJ45 connector with an integrated LEDs option for a 1U product form factor to provide increased density of an RJ45 connector which utilizes open source and non-proprietary modular connectors in conformity with published standards. For example, in one embodiment such systems and apparatuses include a networking component having therein a connector which includes a plurality of RJ45 jacks arranged into exactly three horizontal rows and a plurality of vertical columns; a printed circuit board to electrically interface with each of the plurality of RJ45 jacks; and a 1× Rack Unit (1U) chassis having the connector and printed circuit board therein, in which at least a portion of the connector extends into a horizontal plane occupied by the printed circuit board. Rack systems and methods are further described for employing such a networking component.

20 Claims, 8 Drawing Sheets

(56) References Cited

U.S. PATENT DOCUMENTS

| | | | |
|---|---|---|---|
| 8,771,009 B2* | 7/2014 | Meng et al. | 439/540.1 |
| 2006/0009076 A1* | 1/2006 | Yu | 439/620 |
| 2006/0223366 A1* | 10/2006 | Murayama et al. | 439/541.5 |
| 2010/0142544 A1 | 6/2010 | Chapel et al. | |
| 2010/0254374 A1* | 10/2010 | Fortier | 370/352 |

OTHER PUBLICATIONS

Restriction Requirement for U.S. Appl. No. 13/463,752, Mailed Sep. 10, 2013, 5 pages.

Non-Final Office Action for U.S. Appl. No. 13/463,752, Mailed Dec. 19, 2013, 8 pages.

Notice of Allowance for U.S. Appl. No. 13/463,752, Mailed Apr. 10, 2014, 7 pages.

* cited by examiner

HIGH DENSITY NETWORKING COMPONENT FOR 1U PRODUCT FORM FACTOR AND ASSOCIATED RACK SYSTEM

CLAIM OF PRIORITY

This continuation application is related to, and claims priority to, the non-provisional utility application entitled "3×8 STACKED RJ45 CONNECTOR WITH INTEGRATED LEDS OPTION FOR 1U PRODUCT FORM FACTOR," filed on May 3, 2012, having an application number of Ser. No. 13/463,752, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate generally to the field of networking components, and more particularly, to systems and apparatuses having a 3×8 stacked RJ45 connector with an integrated Light-Emitting Diodes (LEDs) option for a 1U product form factor.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to claimed embodiments.

As the number of networking components and interconnects increases, it becomes necessary to accommodate an increasing number of network cables by providing RJ45 jacks (e.g., receiving sockets) for the network cables. When such networking components are located within a racking system, density of the networking components and the interconnects used for such networking components increases, thus presenting a problem of limited space or real estate within a given rack's physical dimensions.

Network architects will seek to optimize the functionality and number of available jacks within a limited amount of space for each available rack within their networking infrastructure. Failure to optimize functionality over a limited amount of space would lead to a sprawling network infrastructure which utilizes more space, and thus correlates to increased costs. For example, less than optimal functionality for a given space will require additional rack units, which in turn requires more physical space within a server room, which in turn requires a potentially larger building, increased power consumption, increased cooling needs, and so forth.

While prior high density network cable interconnects have been proposed, such solutions either lack a sufficient number of jacks per unit area (e.g., lack "density"), or require proprietary modular connectors (e.g., plugs and jacks) which must be sourced from a specific provider rather than utilizing open source non-proprietary modular connectors which conform to a published standard.

The present state of the art may therefore benefit from the systems and apparatuses having a 3×8 stacked RJ45 connector with an integrated LEDs option for a 1U product form factor, as is described herein.

BRIEF DESCRIPTION OF THE DRAWINGS

Embodiments are illustrated by way of example, and not by way of limitation and can be more fully understood with reference to the following detailed description when considered in connection with the figures in which.

DETAILED DESCRIPTION

Described herein are systems and apparatuses having a 3×8 stacked RJ45 connector with an integrated LEDs option for a 1U product form factor. In accordance with one embodiment, such systems and apparatuses include a networking component having therein a connector which includes a plurality of RJ45 jacks arranged into exactly three horizontal rows and a plurality of vertical columns; a printed circuit board to electrically interface with each of the plurality of RJ45 jacks; and a 1× Rack Unit (1U) chassis having the connector and printed circuit board therein, in which at least a portion of the connector extends into a horizontal plane occupied by the printed circuit board. Rack systems and methods are further described for employing such a networking component.

In the following description, numerous specific details are set forth such as examples of specific systems, standards, components, exemplary nomenclature, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

Any of the above embodiments may be used alone or together with one another in any combination. Although various embodiments may have been partially motivated by deficiencies with conventional techniques and approaches, some of which are described or alluded to within the specification, such embodiments need not necessarily address or solve any of these deficiencies, but rather, may address only some of the deficiencies, address none of the deficiencies, or be directed toward different deficiencies and problems where are not directly discussed.

Figure 1:
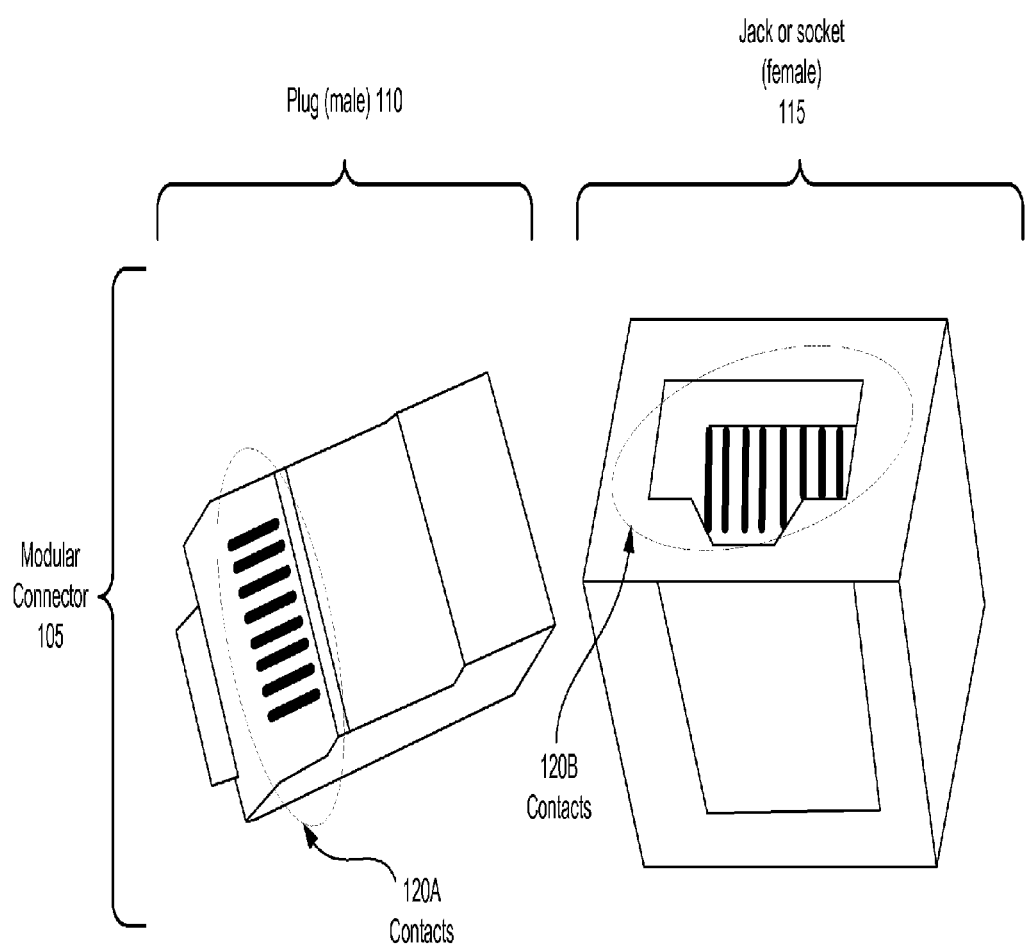
FIG. 1 illustrates an exemplary modular connector in accordance with which embodiments may operate.

FIG. 1 illustrates an exemplary modular connector 105 in accordance with which embodiments may operate. In particular, modular connector 105 is depicted in which a plug (male) 110 and a jack or socket (female) 115 are designed to physically couple or interconnect. The contacts 120A of plug (male) 110 and 120B of jack or socket (female) 115 provide an electrical interface between each of the respective parts of the modular connector 105.

A Registered Jack (RJ) is a standardized physical network interface, both in terms of the physical jack construction and also the requisite wiring pattern. Registered Jacks provide standardization for many of the modular connectors used in telecommunications. Exemplary standard designs for such connectors and their wiring patterns include, for example, RJ11, RJ14, RJ21, RJ45, RJ48, and others.

Modular connectors have gender in which male connectors are referred to as plugs, while female connectors are referred to as jacks or sockets. Thus, a typical RJ45 cable will have two "plug" ends, each to couple with a respective RJ45 "jack" or "socket," for instance, at a networking interconnect, a switch, hub, router, etc., or at a networking end station, such as a personal computer.

A category 5 cable (Cat 5) and category 5 enhanced cable (Cat 5e) are each twisted pair cables for carrying signals and are commonly used for cabling Ethernet based computer networks, but may also be used to carry signals such as telephony and video. Cat 5 and Cat 5e cables are commonly connected using modular connectors, including the RJ45.

The modular connector for Cat 5 and Cat 5e cables is more appropriately denoted as the "8P8C" (8 position 8 contact) modular connector, however, the term RJ45 when used in the context of computer networking is widely understood to refer to the same. Applicants use each of the RJ45 and the 8P8C modular connector interchangeably herein.

Although commonly referred to as an "RJ45" modular connector in the context of Ethernet and category 5/5e cables, it is nevertheless more technically accurate to refer to the generic 8P8C modular connector. Such a term however has not proven popular in the technical nomenclature of those having skill in the relevant arts. Nevertheless, the shape and dimensions of an 8P8C modular connector when used for data communication applications (e.g., Local Area Networking (LAN), structured cabling, etc.), are specified by the International Electrotechnical Commission (IEC) IEC 60603 standard specifying in parts 7-1, 7-2, 7-4, 7-5, and 7-7, which set forth not only the physical dimensions for the 8P8C modular connector, but also high-frequency performance requirements for shielded and unshielded versions of this connector for various frequencies, such as 100, 250 and 600 MHz, etc.

Figure 2:
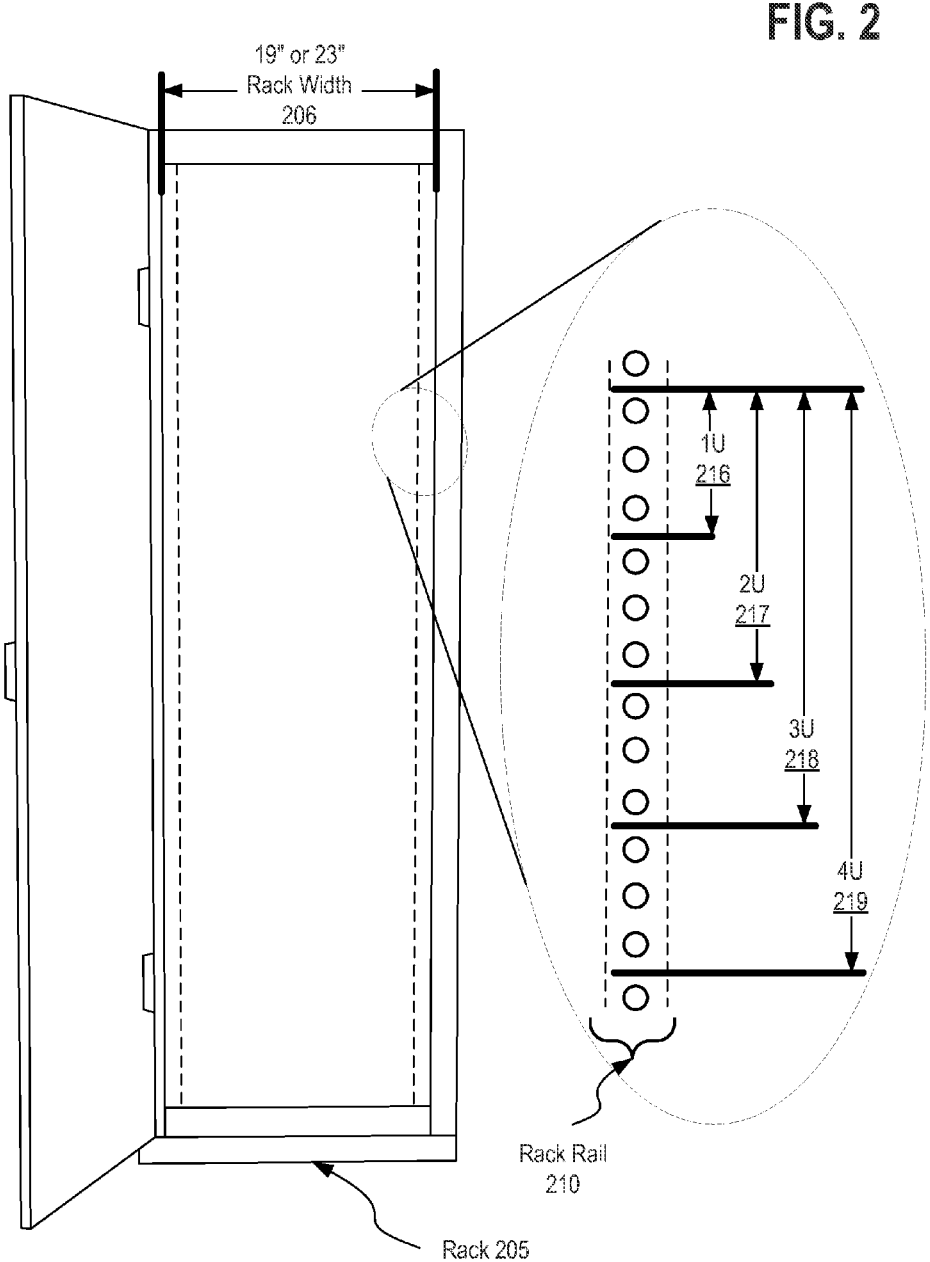
FIG. 2 illustrates an exemplary rack in accordance with which embodiments may operate.

FIG. 2 illustrates an exemplary rack 205 in accordance with which embodiments may operate. In particular, depicted with rack 205 is either a 19-inch or 23-inch rack width 206, each standardized rack widths. Within the rack is a rack rail 210 in conformity with standardized Rack Units (RUs)." Specifically depicted on the rack rail 210 are several RU spacings, including 1U 216, 2U 217, 3U 218, and 4U 219.

A 19-inch rack 205 is a standardized frame or enclosure for mounting multiple modules of network equipment or other electronic equipment. Each module to be installed will therefore have a front panel that is 19 inches (482.6 mm) wide, including edges or ears that protrude on each side which allow the module to be fastened to the rack frame with screws. A 23-inch rack is another standardized rack width 206, but is less common than the 19-inch rack. Regardless, both the 19 and 23-inch racks utilize the Rack Unit as a measure of vertical spacing.

The Rack Unit (either "U" or "RU") is the standard unit of measure for designating the vertical usable space within a rack. One rack unit is 1.75 inches (44.45 mm) high.

The size of a piece of rack-mounted equipment is commonly described as a number in "U" and understood by those in the art to be in conformance with applicable standards, and thus, such equipment conforming to the Rack Unit of measurement will fit within the physical constraints and dimensionality of a conforming standardized rack system. For example, one rack unit is often referred to as "1U" and is thus 1.75 inches in height, two rack units would thus be "2U" and therefore be 3.5 inches in height, and so on.

A typical full size rack is 44U, which means it holds just over 6 feet of equipment, and a typical "half-height" rack would be 18-22U, or around 3 feet high.

The rack unit size is based on a standard rack specification as defined the Electronic Industries Alliance (EIA) EIA-310 and EIA-310-E standards.

Figure 3:
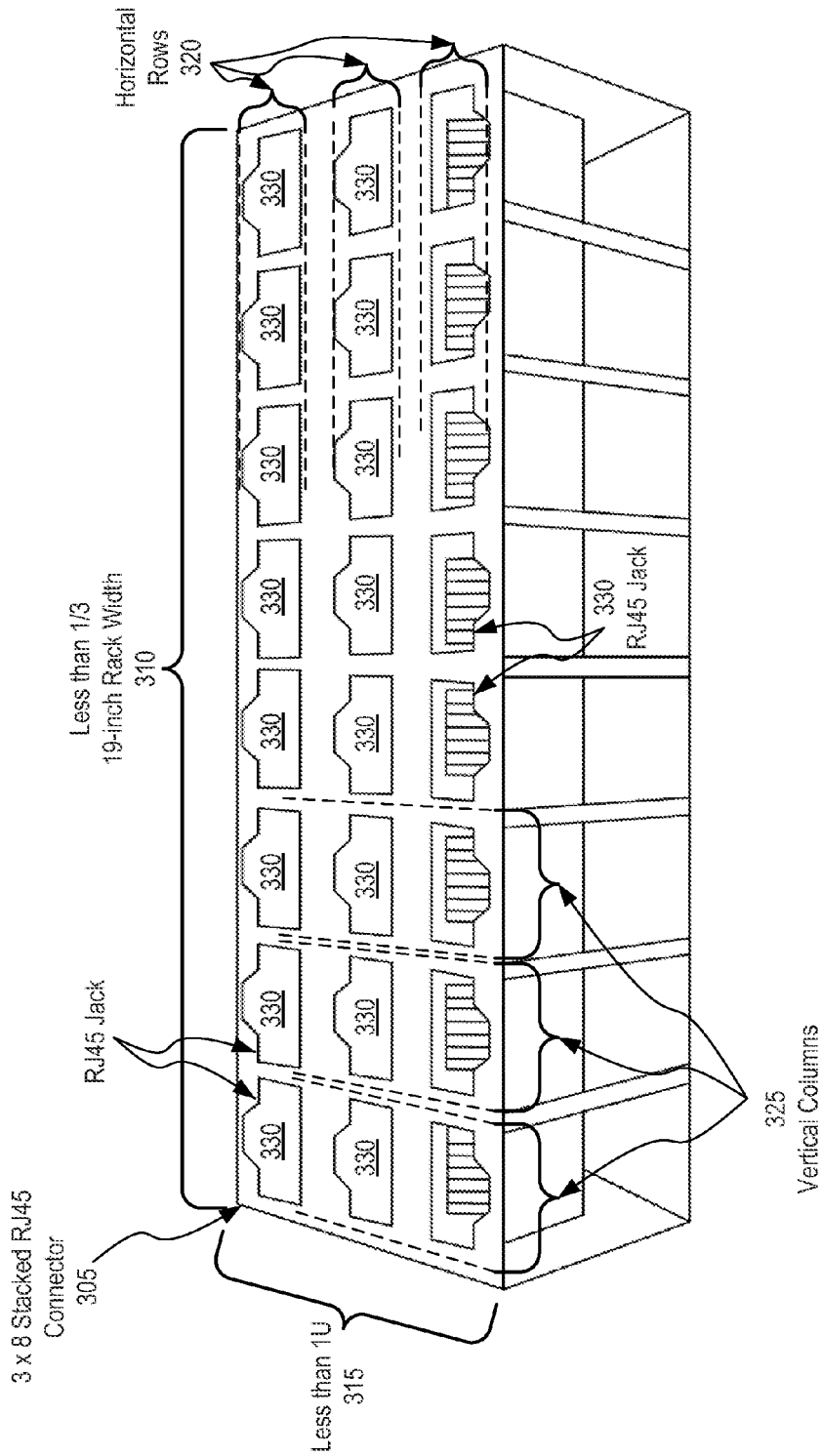
FIG. 3 illustrates an exemplary 3×8 stacked RJ45 connector in accordance with which embodiments may operate.

FIG. 3 illustrates an exemplary 3×8 stacked RJ45 connector 305 in accordance with which embodiments may operate. In accordance with the depicted embodiment, the height of the connector 305 is less than 1U 315 and has a width which is less than ⅓ of a 19-inch rack width. Because the connector 305 is less than 1U in height and less than ⅓ of a 19-inch rack width, a networking component can be built having the connector 305 integrated therein and conform to the physical space constraints of a 1U rack opening, and further permit one, two, or three such connectors 305 to be installed laterally across the width of a standard 19-inch rack width within a 1U space. In an alternative embodiment, such a connector 310 has a width less than ⅓ of a 23-inch standardized rack such that one, two, or three such connectors 305 can be installed laterally across the width of a standard 23-inch rack width within a 1U space.

Further depicted is the connector 305 having 3×8 stacked RJ45 jacks 330, in which the 24× total RJ45 jacks are arranged into exactly three horizontal rows 320 stacked upon one another and further multiple vertical columns 325. In accordance with one embodiment, the RJ45 jacks 330 are vertically aligned within the multiple vertical columns 325, that is, no lateral shift exists between the RJ45 jacks 330 on different rows which occupy the same vertical column 325. In the depicted embodiment eight vertical columns 325 are shown, but other numbers of columns are accommodated depending on the design width of the connector. According to one embodiment, all of the RJ45 jacks 330 conform to at least one open source and non-proprietary standard, such as the IEC 60603 standard.

Notably, use of the depicted RJ45 jacks 330 does not require any specialty or proprietary cable, modular connector, dongle, converter, etc. Whereas other proposed solutions overcome the physical space constraints through the use of specialized and proprietary receiving jacks on the connector, the solutions and embodiments taught and claimed herein are expressly directed toward connectors in compliance with non-proprietary and open-source modular connectors, such as the RJ45 jacks 330 noted above in compliance with, for example, the IEC 60603 standard.

Figure 4:
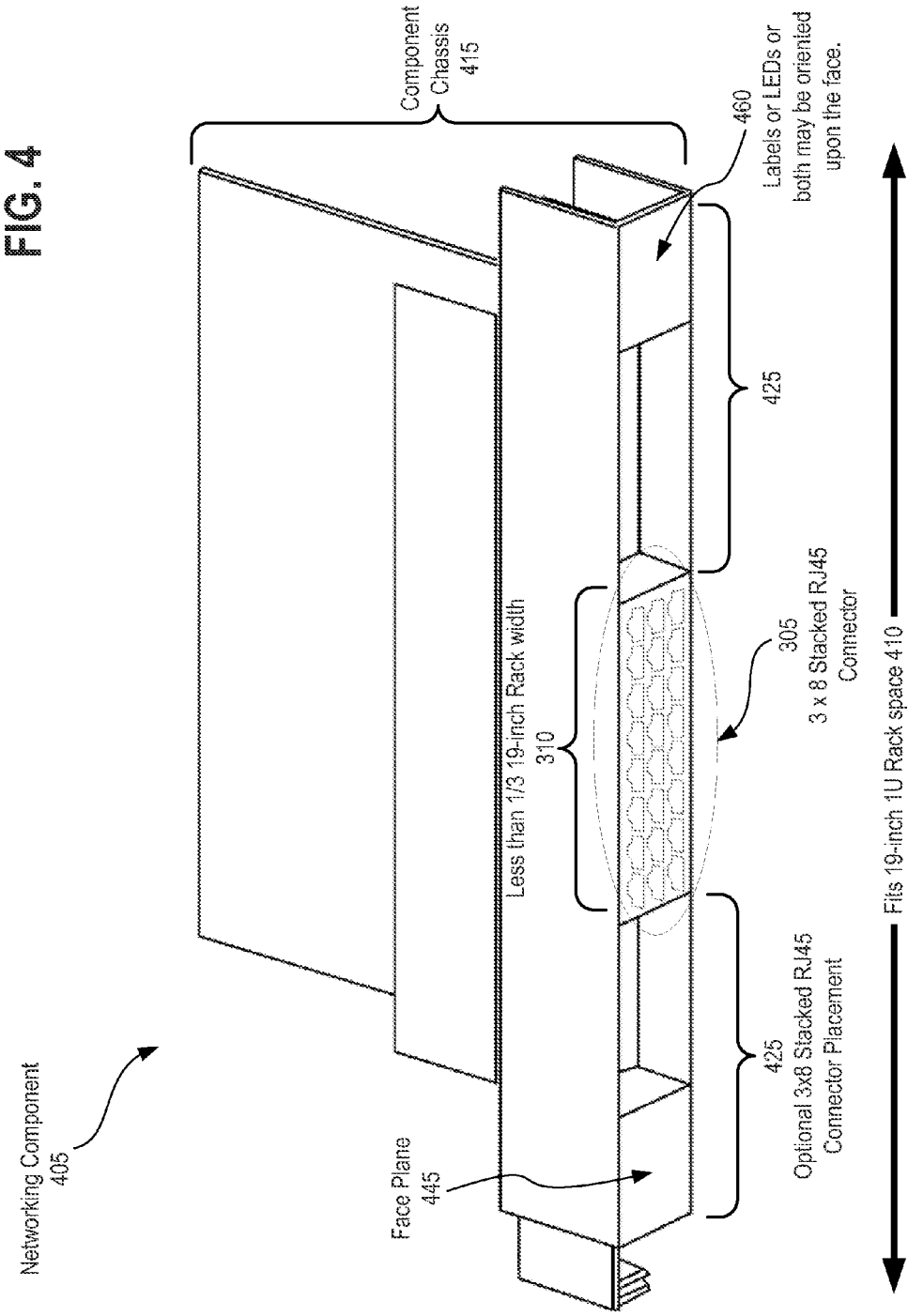
FIG. 4 illustrates an exemplary networking component in accordance with which embodiments may operate.

FIG. 4 illustrates an exemplary networking component 405 in accordance with which embodiments may operate. In particular, network component 405 is depicted as having the exemplary 3×8 stacked RJ45 connector 305 from FIG. 3 incorporated therein. The networking component 405 is structurally supported by component chassis 415 and fits within a 19-inch 1U rack space 410. The exemplary 3×8 stacked RJ45 connector 305 depicted again has a width which is less than ⅓ of a 19-inch rack width 310, and thus, the networking component 405 and its chassis 415 may incorporate one, two, or three such connectors 305 laterally across the 19-inch 1U rack space 410 depicted. For instance, element 425 depicts an optional 3×8 stacked RJ45 connector placement to the lateral left and to the lateral right of the exemplary 3×8 stacked RJ45 connector 305 depicted. In an alternative embodiment, the networking component 405 and its chassis 415 conform to the width of a 23-inch 1U rack space, and thus, may incorporate one, two or three such connectors 305 laterally across the available 23-inch 1U rack space.

According to one embodiment, labels may optionally be applied to the face plane 445 of the networking component. For instance, labels may be silk screened to the face plane 445 or otherwise applied so as to identify the multiple RJ45 jacks of the connector 305. In one embodiment, the labels are applied to a portion of the top chassis layer or a portion of a bottom chassis layer exposed at the face plane 445 of the network component 405. For instance, an exterior portion of sheet metal above and below the connector 305 may be used for the labels.

According to one embodiment, LED indicators may optionally be positioned within the face plane 445 of the networking component. For instance, LED indicators providing status for the respective RJ45 jacks of the connector 305 may be oriented within the face plane 445 or otherwise oriented on the face of the networking component 405 so as to indicate status for each and every one of the multiple RJ45 jacks of the connector 305. In one embodiment, 2× multi-color LEDs are provided for each of the multiple RJ45 jacks of the connector 305.

Element 460 depicts that labels or LEDs or both may be oriented upon the face of networking component 405.

Figure 5:
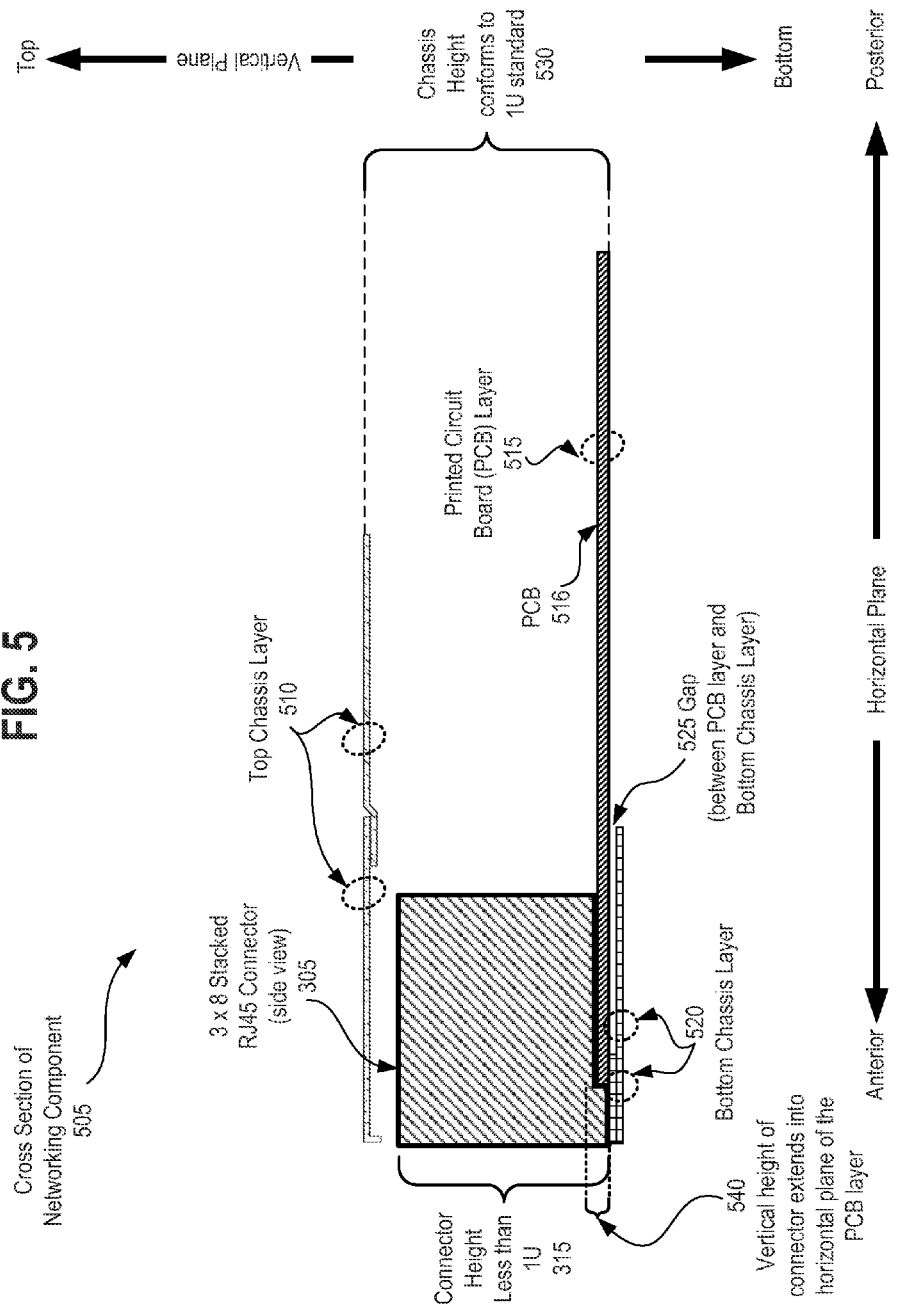
FIG. 5 illustrates a cross section of an exemplary networking component in accordance with which embodiments may operate.

FIG. 5 illustrates a cross section (e.g., a "side view") of an exemplary networking component 505 in accordance with which embodiments may operate. In particular, the exemplary 3×8 stacked RJ45 connector 305 from FIGS. 3 and 4 is again depicted, but as a side view. As can be seen from the depicted embodiment, the chassis of the networking component includes at least the top chassis layer 510, the bottom chassis layer 520, a printed circuit board (PCB) 516 occupying a horizontal plane of the printed circuit board layer 515, and the connector 305 again having a height of less than 1U 315. The total chassis height conforms to a 1U standard 530 height, such as the height and tolerances set forth by applicable standards. Formed between the bottom chassis layer 520 and the PCB 516 is a gap 525 between the PCB layer 515 and the bottom chassis layer 520.

As depicted, the connector 305 has a vertical height that extends into the horizontal plane of the PCB layer as noted by element 540. Thus, at least a portion of the connector 305 occupies the same space established by the horizontal plane of the printed circuit board layer 515. More specifically, as depicted, the lowermost part of the connector 305 is positioned anterior (in front of) the PCB 516 within the horizontal plane of the PCB layer 515 and the PCB 516 is positioned also within the horizontal plane of the PCB layer 515 but posterior (behind or in back of) to a lowermost portion of the connector 305 which extends into the horizontal plane of the PCB layer 515 as noted by element 540. In one embodiment, a portion of the connector 305 sits atop the PCB 516, such as in the orientation depicted by the embodiment of FIG. 5.

Figure 6:
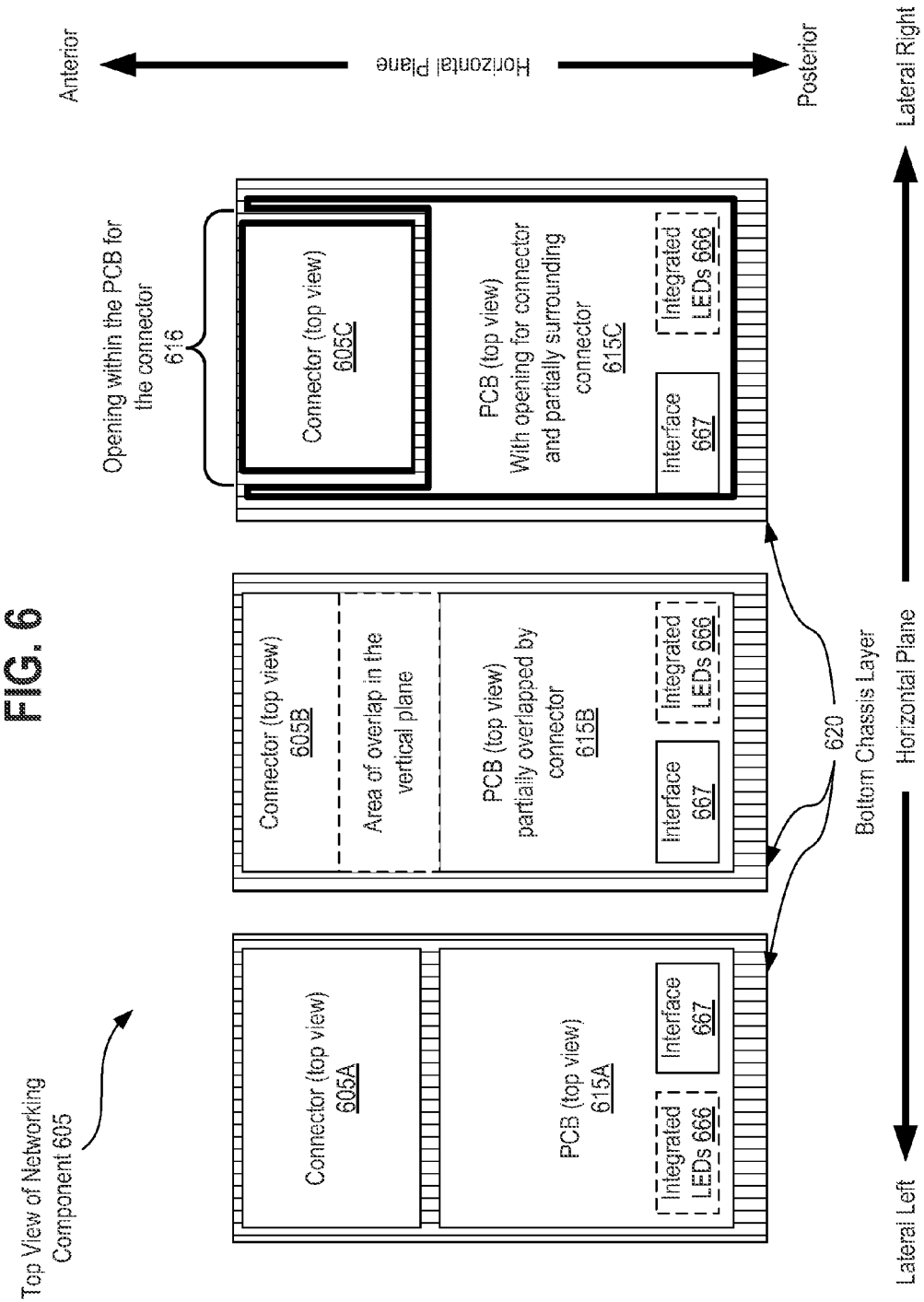
FIG. 6 illustrates various top views of a networking component in accordance with which embodiments may operate.

FIG. 6 illustrates various top views of a networking component 605 in accordance with which embodiments may operate. In particular, the connector and PCB are depicted from a top view in various orientations upon a bottom chassis layer 620.

In one alternative embodiment, the connector 605A is positioned wholly anterior to the PCB 615A with no overlap between the connector 605A and the PCB 615A within the vertical plane. In yet another embodiment, the PCB 615B is partially overlapped by the connector 605B, for instance, a lowermost portion of the connector 605B is positioned anterior to the PCB 615B within the horizontal plane established by the PCB layer and another portion of the same connector 605B does not extend into the horizontal plane of the PCB layer and is positioned above and atop the PCB 615B which is positioned posterior to the lowermost portion of the connector 605B extending vertically down into the horizontal plane of the PCB layer.

In yet another embodiment, the PCB 615C provides an opening within the PCB for the connector as depicted by element 616, into which the lowermost portion of the connector 605C may extend vertically down into or drop into, such that a lowermost portion of the connector 605C occupies a space (e.g., the opening at 616) within a horizontal plane established by the PCB layer upon which PCB 615C is oriented and in which the PCB 615C partially surrounds the lowermost portion of the connector 605C within the space of the horizontal plane established by the PCB layer 615C. In the depicted embodiment, the PCB 615C partially surrounds the connector 605C on three sides, including the lateral left, the lateral right, and the posterior, but not the anterior.

Further depicted upon each of PCBs 615A-C are interfaces 667 which electrically connect or electrically interface the multiple RJ45 jacks within the connectors 605A-C to the PCBs 615A-C. For instance, the contacts 120B of the jack 115 depicted at FIG. 1 have leads interconnecting the respective pin outs of the modular connector 105 (via contacts 120A of plug 110) to the PCBs 615A-C through the respective interfaces 667.

Additionally depicted upon each of PCBs 615A-C are optionally integrated LEDs 666. For instance LEDs oriented upon a face of the connectors 605A-C as described previously may be electrically connected to integrated LEDs 666 upon the respective PCBs 615A-C. In one embodiment, integrated LEDs 666 embodies an LED controller for multiple LEDs oriented within the face of the respective connectors 605A-C. In an alternative embodiment, the LEDs are interfaced through a connecting cable to an LED controller for the LEDs which is connected with but not integrated within the respective PCBs 615A-C.

Figure 7:
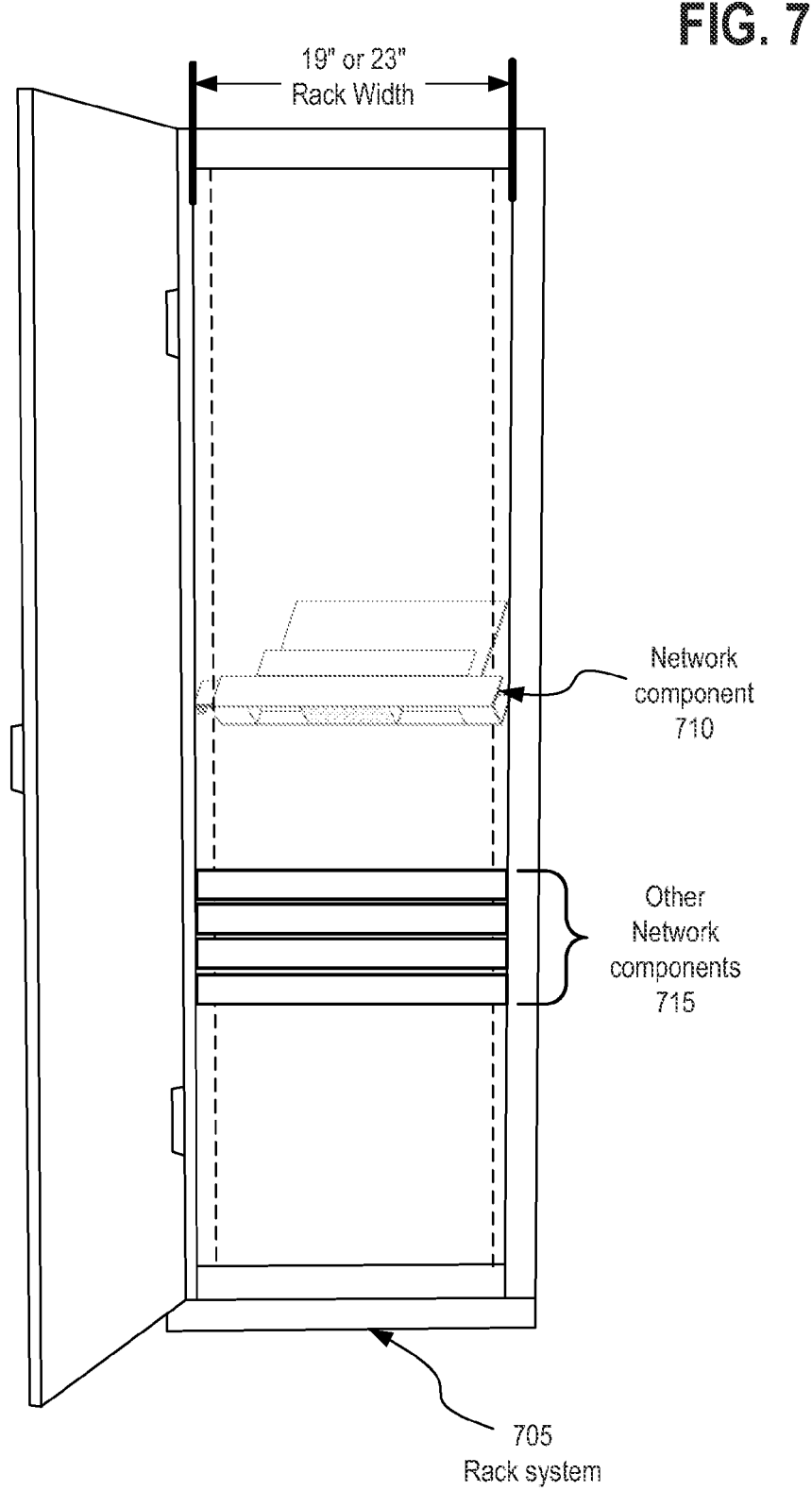
FIG. 7 illustrates a rack system in accordance with which embodiments may operate.

FIG. 7 illustrates a rack system 705 in accordance with which embodiments may operate. In particular, the rack system 705 denotes either a 19-inch or a 23-inch standard rack width in accordance with one embodiment. Further depicted is a network component 710, such as the network component having the above described connector embodied therein, and one or more other network components 715, such as switches, routers, etc.

According to one embodiment, there is a rack system 705 having rack rails therein for mounting one or more network components and further having at least a 1× Rack Unit (1U) chassis mounted to the rack rails of the rack system, in which the 1U chassis itself includes (a) a connector, in which the connector includes a plurality of RJ45 jacks arranged into exactly three horizontal rows and a plurality of vertical columns, (b) a printed circuit board to electrically interface with each of the plurality of RJ45 jacks, and (c) further in which the 1U chassis having the connector and printed circuit board therein includes at least a portion of the connector extending into a horizontal plane occupied by the printed circuit board within the 1U chassis.

According to one embodiment, each of the plurality of RJ45 jacks embody a female portion of an 8P8C (8 position 8 contact) modular connector in compliance with the International Electrotechnical Commission (IEC) IEC 60603 standard. According to another embodiment, the rack system 805 embodies a 19-inch rack or a 23-inch rack in which the vertical space of the rack system 805 is arranged into a plurality of Rack Units (RUs) in conformity with dimensional height requirements specified by the Electronic Industries Alliance (EIA) EIA-310 or EIA-310-E standards, or both.

Figure 8:
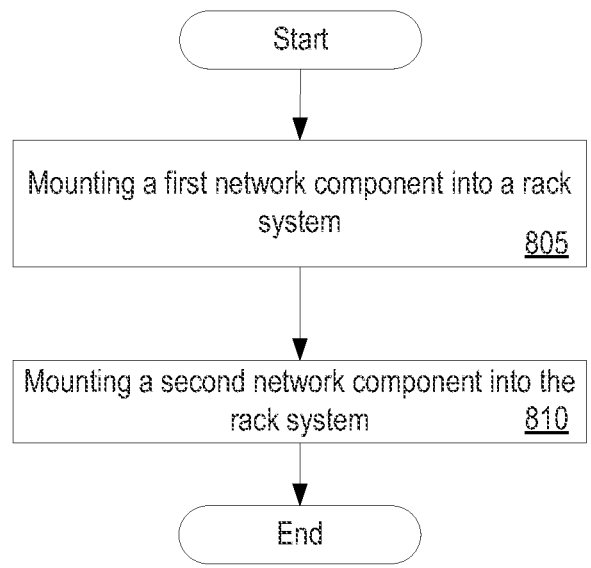
FIG. 8 illustrates a method for mounting one or more network components into a rack system in accordance with which embodiments may operate.

FIG. 8 illustrates a method 800 for mounting one or more network components into a rack system in accordance with which embodiments may operate.

Method 800 begins at block 805 with mounting a first network component into the rack system. In such an embodiment, the first network component includes: a connector having therein a plurality of RJ45 jacks arranged into exactly three horizontal rows and a plurality of vertical columns, a printed circuit board to electrically interface with each of the plurality of RJ45 jacks, and a 1× Rack Unit (1U) chassis having the connector and printed circuit board therein, in which at least a portion of the connector extends into a horizontal plane occupied by the printed circuit board.

At block 810, the method continues by mounting a second network component into the rack system.

Other operations may further be included, such as connecting Ethernet cables to the RJ45 jacks of the connector.

While embodiments have been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the invention is therefore determined in reference to the appended claims, along with the full scope of equivalents to which such claims are entitled.

What is claimed is:

1. A high density form factor networking component comprising:
    a plurality of RJ45 mechanically compatible connectors arranged into exactly three horizontal rows; a printed circuit board to electrically interface with each of the plurality of RJ45 mechanically compatible connectors;
    the high density form factor networking component constituting a 1× Rack Unit (1U) chassis connector having the RJ45 mechanically compatible connectors and printed circuit board therein, wherein at least a portion of the connector extends into a horizontal plane occupied by the printed circuit board;
    wherein the 1U chassis connector further includes: (i) a bottom chassis layer, (ii) the printed circuit board atop the bottom chassis layer, (iii) the plurality of RJ45 mechanically compatible connectors, and (iv) a top chassis layer; and
    wherein the plurality of RJ45 mechanically compatible connectors are oriented atop the bottom chassis layer in which a lowermost portion of the plurality of RJ45 mechanically compatible connectors is positioned anterior to the printed circuit board.

2. The high density form factor networking component of claim 1, wherein each of the plurality of RJ45 mechanically compatible connectors embody a female portion of an 8P8C (8 position 8 contact) modular connector in compliance with the International Electrotechnical Commission (IEC) IEC 60603 standard.

3. The high density form factor networking component of claim 1, wherein each of the plurality of RJ45 mechanically compatible connectors adhere to an open-source standard.

4. The high density form factor networking component of claim 1, wherein each of the plurality of RJ45 mechanically compatible connectors accept a category 5 or category 5e Ethernet cable via an RJ45 plug end without requiring use of a cable converter, adapter, or dongle.

5. The high density form factor networking component of claim 1, wherein 1× Rack Unit (1U) chassis connector complies with dimensional height requirements specified by the Electronic Industries Alliance (EIA) EIA-310 or EIA-310-E standards, or both.

6. The high density form factor networking component of claim 1, wherein 1× Rack Unit (1U) chassis connector complies occupies one Rack Unit of space within a 19-inch or 23-inch rack when installed within the respective 19-inch or 23-inch rack.

7. The high density form factor networking component of claim 1, wherein the high density form factor networking component constitutes a 3×8 stacked connector having a total of twenty-four RJ45 mechanically compatible connectors arranged into the exactly three horizontal rows.

8. The high density form factor networking component of claim 1, wherein the plurality of RJ45 mechanically compatible connectors are aligned within the multiple columns such that at least some lateral shift exists between the plurality of RJ45 mechanically compatible connectors on different rows which occupy a same column.

9. The high density form factor networking component of claim 1:
    wherein the plurality of RJ45 mechanically compatible connectors constitute a total height of less than 1U; and
    wherein the plurality of RJ45 mechanically compatible connectors constitutes a total width which is less than $\frac{1}{3}$ of a 19-inch rack width.

10. The high density form factor networking component of claim 9, further comprising:
    a second and a third plurality of RJ45 mechanically compatible connectors, each arranged into exactly three horizontal rows;
    a second and a third printed circuit board to electrically interface with each of the second and third plurality of RJ45 mechanically compatible connectors; and
    wherein the second and the third plurality of RJ45 mechanically compatible connectors and the second and the third printed circuit boards are incorporated into the same 1U space of the 1U chassis connector resulting in the first, the second, and the third plurality of RJ45 mechanically compatible connectors occupying space within the same 1U space of the 1U chassis connector.

11. The high density form factor networking component of claim 1, further comprising:
    a face plane, wherein the plurality of RJ45 mechanically compatible connectors are exposed at the face plane;
    wherein the face plane of the high density form factor networking component comprises a plurality of labels uniquely identifying each of the plurality of RJ45 mechanically compatible connectors exposed at the face plane;
    wherein the face plane of the plurality of RJ45 mechanically compatible connectors comprises a plurality of Light-Emitting Diodes (LEDs) oriented within the face plane and exposed by the face plane, wherein the LEDs indicate status for each of the plurality of RJ45 mechanically compatible connectors exposed at the face plane; and wherein each of the LEDs oriented within the face plane are electrically connected with an LED controller integrated to the printed circuit board.

12. The high density form factor networking component of claim 1:

wherein the printed circuit board is oriented upon the horizontal plane within the 1U chassis connector establishing a printed circuit board layer; and wherein the portion of the plurality of RJ45 mechanically compatible connectors that extends into the horizontal plane occupied by the printed circuit board is characterized by one of the following:

(a) the plurality of RJ45 mechanically compatible connectors being positioned wholly anterior to the printed circuit board with no overlap between the plurality of RJ45 mechanically compatible connectors and the printed circuit board within a vertical plane;

(b) the printed circuit board is partially overlapped by the plurality of RJ45 mechanically compatible connectors, wherein a lowermost portion of the plurality of RJ45 mechanically compatible connectors is positioned anterior to the printed circuit board within the horizontal plane established by the printed circuit board layer and further wherein another portion of the plurality of RJ45 mechanically compatible connectors does not extend into the horizontal plane of the printed circuit board layer and is positioned above and atop the printed circuit board which is positioned posterior to the lowermost portion of the plurality of RJ45 mechanically compatible connectors which extends vertically down into the horizontal plane of the printed circuit board layer; or (c) the printed circuit board having an opening for the plurality of RJ45 mechanically compatible connectors, wherein lowermost portion of the plurality of RJ45 mechanically compatible connectors extends vertically down into the opening of the printed circuit board such that the lowermost portion of the plurality of RJ45 mechanically compatible connectors occupies a space within the printed circuit board layer and further wherein the printed circuit board at least partially surrounds the connector at a lateral left side, at a lateral right side, and at a posterior side, but does not surround the connector at an anterior side.

13. A rack system comprising:

rack rails; and a 1× Rack Unit (1U) chassis mounted to the rack rails of the rack system, the 1U chassis having embodied therein:

a plurality of RJ45 mechanically compatible connectors arranged into exactly three horizontal rows;

a printed circuit board to electrically interface with each of the plurality of RJ45 mechanically compatible connectors;

the high density form factor networking component constituting a 1× Rack Unit (1U) chassis connector having the connector and printed circuit board therein, wherein at least a portion of the connector extends into a horizontal plane occupied by the printed circuit board;

wherein the 1U chassis connector further includes: (i) a bottom chassis layer, (ii) the printed circuit board atop the bottom chassis layer, (iii) the plurality of RJ45 mechanically compatible connectors, and (iv) a top chassis layer; and wherein the plurality of RJ45 mechanically compatible connectors are oriented atop the bottom chassis layer in which a lowermost portion of the connectors is positioned anterior to the printed circuit board.

14. The rack system of claim 13, wherein the 1U chassis embodies a high density form factor networking component having therein the plurality of RJ45 mechanically compatible connectors, wherein the high density form factor networking component constitutes a 3×8 stacked connector having a total of twenty-four RJ45 mechanically compatible connectors arranged into the exactly three horizontal rows.

15. The rack system of claim 13, wherein each of the plurality of RJ45 mechanically compatible connectors embody a female portion of an 8P8C (8 position 8 contact) modular connector in compliance with the International Electrotechnical Commission (IEC) IEC 60603 standard.

16. The rack system of claim 13, further comprising:
one or more other network components mounted to the rack rails.

17. The rack system of claim 13:
wherein the rack system embodies a 19-inch rack or a 23-inch rack; and
wherein vertical space of the rack system is arranged into a plurality of Rack Units (RUs) in conformity with dimensional height requirements specified by the Electronic Industries Alliance (EIA) EIA-310 or EIA-310-E standards, or both.

18. The rack system of claim 13, wherein each of the plurality of RJ45 mechanically compatible connectors accept a category 5 or category 5e Ethernet cable via an RJ45 plug end without requiring use of a cable converter, adapter, or dongle.

19. The rack system of claim 13, wherein the plurality of RJ45 mechanically compatible connectors are aligned such that at least some lateral shift exists between the plurality of RJ45 mechanically compatible connectors on different rows which occupy a same column.

20. The rack system of claim 13, wherein
wherein the printed circuit board is oriented upon the horizontal plane within the 1U chassis establishing a printed circuit board layer; and
wherein the portion of the plurality of RJ45 mechanically compatible connectors that extends into the horizontal plane occupied by the printed circuit board is characterized by one of the following:

(a) the plurality of RJ45 mechanically compatible connectors being positioned wholly anterior to the printed circuit board with no overlap between the plurality of RJ45 mechanically compatible connectors and the printed circuit board within a vertical plane;

(b) the printed circuit board is partially overlapped by the plurality of RJ45 mechanically compatible connectors, wherein a lowermost portion of the plurality of RJ45 mechanically compatible connectors is positioned anterior to the printed circuit board within the horizontal plane established by the printed circuit board layer and further wherein another portion of the plurality of RJ45 mechanically compatible connectors does not extend into the horizontal plane of the printed circuit board layer and is positioned above and atop the printed circuit board which is positioned posterior to the lowermost portion of the plurality of RJ45 mechanically compatible connectors which extends vertically down into the horizontal plane of the printed circuit board layer; or (c) the printed circuit board having an opening for the plurality of RJ45 mechanically compatible connectors, wherein lowermost portion of the plurality of RJ45 mechanically compatible connectors extends vertically down into the opening of the printed circuit board such that the lowermost portion of the plurality of RJ45 mechanically compatible connectors occupies a space within the printed circuit board layer and further wherein the printed circuit board at least partially surrounds the connector at a lateral left side, at a lateral right side, and at a posterior side, but does not surround the connector at an anterior side.

* * * * *